United States Patent [19]

Tiedt

[11] 4,009,832
[45] Mar. 1, 1977

[54] IRRIGATION MEANS FOR THE UNIFORM DISTRIBUTION OF LIQUID

[76] Inventor: Uwe Tiedt, Karlstrasse 14, 7550 Rastatt, Germany

[22] Filed: July 30, 1975

[21] Appl. No.: 600,722

[30] Foreign Application Priority Data

Aug. 6, 1974 Germany .......................... 2437730

[52] U.S. Cl. .............................. 239/542; 239/111
[51] Int. Cl.² ......................................... B05B 15/00
[58] Field of Search .......... 239/542, 546, 547, 111; 137/505, 517

[56] References Cited

UNITED STATES PATENTS

| 3,080,124 | 3/1963  | Rothmann | 239/542 X |
| 3,567,134 | 3/1971  | Smith    | 239/547   |
| 3,698,195 | 10/1972 | Chapin   | 239/542 X |
| 3,779,468 | 12/1973 | Spencer  | 239/542   |
| 3,797,754 | 3/1974  | Spencer  | 239/542   |
| 3,874,598 | 4/1975  | Havens   | 239/542   |

*Primary Examiner*—William R. Cline
*Attorney, Agent, or Firm*—Fleit & Jacobson

[57] ABSTRACT

A tube is provided with outlet apertures along its length and an internal flap adapted to throttle the flow of liquid through the apertures to an extent that is variable in response to the liquid pressure within the tube.

11 Claims, 19 Drawing Figures

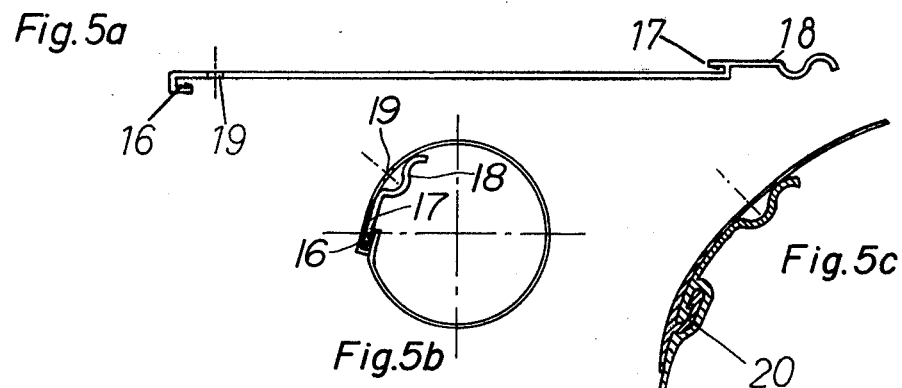
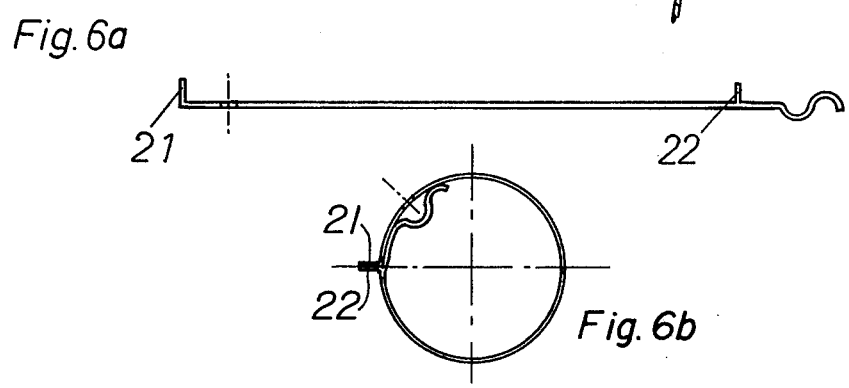
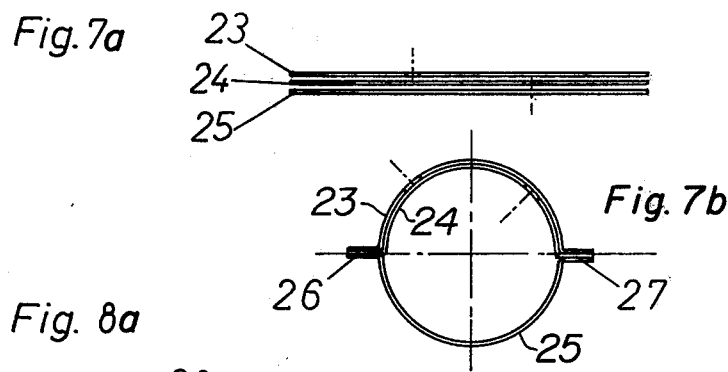
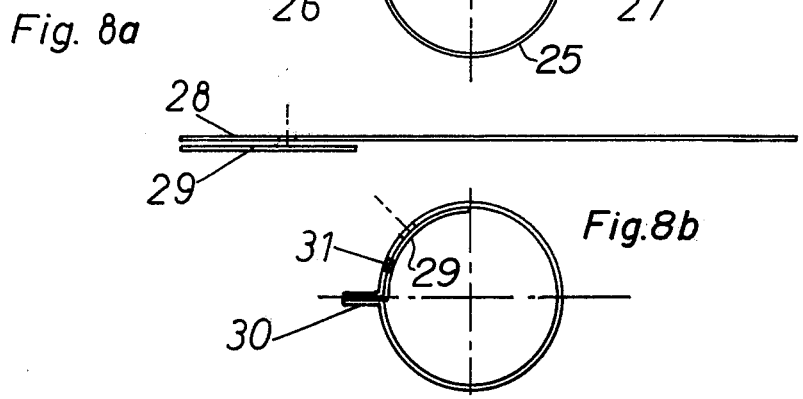

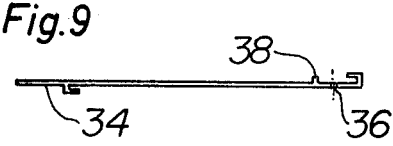
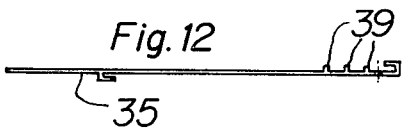
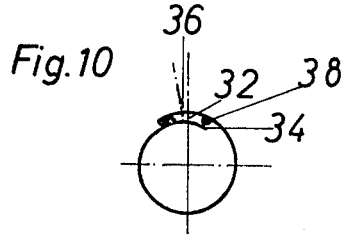
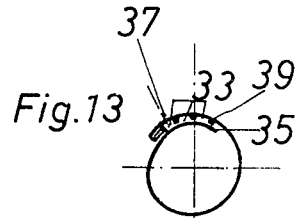
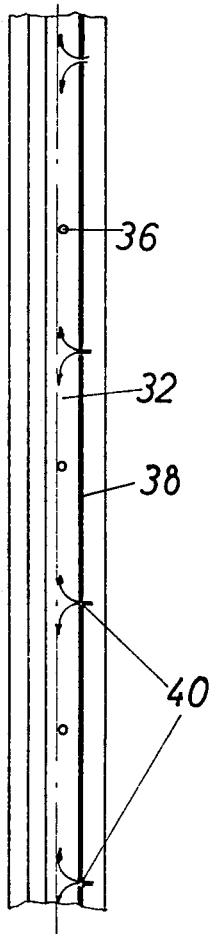
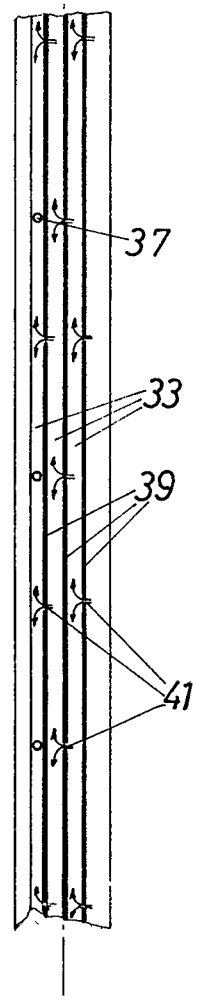

4,009,832

IRRIGATION MEANS FOR THE UNIFORM DISTRIBUTION OF LIQUID

BACKGROUND OF THE INVENTION

The invention relates to irrigation means for the uniform distribution of a controlled quantity of liquid and preferably installed under the surface of the ground.

Known irrigation systems in essence work on one of the following principles. In one system, tubes are used having a small diameter and pore-like outlet apertures giving small outlet quantities. The small outlet quantities result in a small liquid pressure drop. The small outlet quantities are occasioned by the tiny outlet apertures and the largest possible wall thickness of the tube. This means that the wall thickness is often thicker than might be necessary for production reasons and that the pore-like outlet apertures can very rapidly become blocked by impurities that are carried along in the liquid, whereby the irrigation system soon becomes useless. This disadvantageous result can be delayed only by means of expensive filtering plant.

In another system, tubes are used having a large diameter and individual outlet apertures giving large outlet quantities. A large liquid pressure drop occurs along the tube by reason of the large outlet quantities. The large pressure drop results in markedly different outlet quantities at the individual outlet apertures. Consequently, only short tube lengths can be used in order that the different outlet quantities at the individual outlet apertures and the resultant non-uniform liquid distribution can be kept within acceptable limits. However, short tube lengths require a larger number of inlet points. The installation costs are therefore very high and the system is uneconomical for many purposes.

According to a third known irrigating method, the tubes are equipped with individual adjustable outlet valves. Setting of the individual valves achieves the desired uniformity in the distribution of liquid along the tube. However, this method is very uneconomical because of the high manufacturing costs and the labour time for setting the individual valves.

SUMMARY OF THE INVENTION

The invention has an object to improve known irrigation system, so that a substantially uniform distribution of liquid is achieved without the need for separate valves in the outlet apertures and with a tube wall thickness governed only by the internal liquid pressure to be withstood. It is a further object that any impurities in the region of the outlet apertures be flushed out by a self-cleaning effect which is controlled by the liquid pressure.

According to the invention, the irrigation tube is provided with an internal flap underlying the outlet apertures and by means of which the outflow resistance offered to the liquid is variable in response to the liquid pressure in the tube. In one embodiment, at least one longitudinal portion of the flap lies against the inner surface of the tube wall under liquid pressure and the contacting faces of the tube and flap throttle the throughflow of liquid by reason of the surface structure. If the material from which the tube is made does not already possess a suitable surface structure in the as-made condition, the desired surface structure for forming a throttle gap at the location making contact with the flap must be brought about by suitable treatment. In another embodiment, a longitudinal section of the flap makes line contact with the inner surface of the tube, for example by means of at least one ridge or rib provided in the tube.

The invention offers the following advantages. Any impurities are flushed out through the throttle gap when the supply of liquid to the tube is first turned on because the liquid pressure increases from zero and, before the throttle gap is formed under full liquid pressure, the impurities have sufficient free space to escape between the flap and the inner surface of the tube or the ridge thereon, and therefore at this stage no blocking can occur. Another advantage is that, even for a small outflow of liquid, the wall thickness of the tube need not be designed according to the desired liquid pressure drop but only according to the internal liquid pressure to be withstood by the tube. Further, long lengths of tube are possible between adjacent feed points for connecting the tube to the liquid supply. Since a blockage caused by impurities is effectively avoided, there is also no limit to the life of the irrigation system in this respect.

Another advantage is that the flap, which is movable under the pressure of the liquid, mechanically destroys at the earliest possible time any roots that might grow into the outlet apertures and which, on further growth, would block the outlet apertures or tear them or even block the entire cross-section of the tube. To prevent the entry of sand particles disposed above the tube, the outlet apertures may be in the form of intersecting slits in the tube. All the aforementioned advantages contribute to a considerable improvement in the economics of the irrigation system.

To reduce transport and storage costs, it is advantageous to extrude the tube in band form from plastics material and to provide the band with interlocking pressure or slide fastener formations for securing the band in tubular form prior to use. The use of formations employing four interlocking hooks has proved particularly advantageous in providing a fluid-tight seal. When using slide fastener sections, the hooks are interengaged by means of a slider.

Examples of the invention will now be described with reference to the accompanying diagrammatic drawings.

BRIEF DESCRIPTION OF THE DRAWINGS

FIG. 5a is an end view of a modification of the FIG. 3 construction showing the tube in the as-made condition;

FIG. 5b is an end view corresponding to FIG. 5a but showing the tube in a curled condition when ready for use;

FIG. 5c is an enlarged fragmentary sectional view of the FIG. 5b tube;

FIGS. 6a and 6b are views similar to FIGS. 5a and 5b, respectively, of a modification differing from the FIGS.

Figure 2:
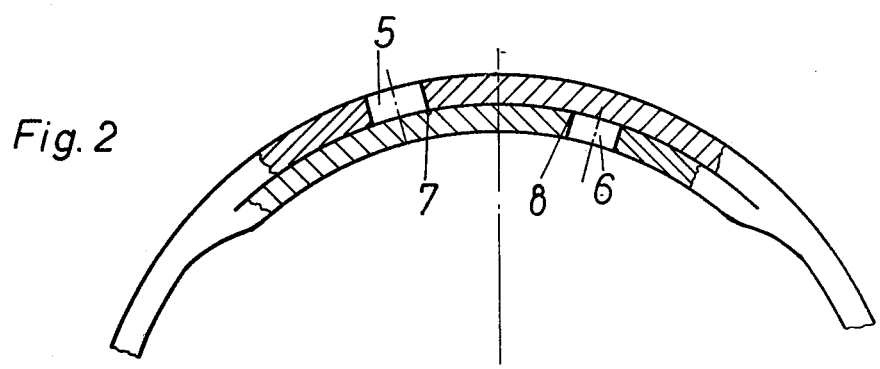
FIG. 2 is a similar view of a second embodiment, wherein the baffle strip is in the form of a diaphragm.
Figure 1:
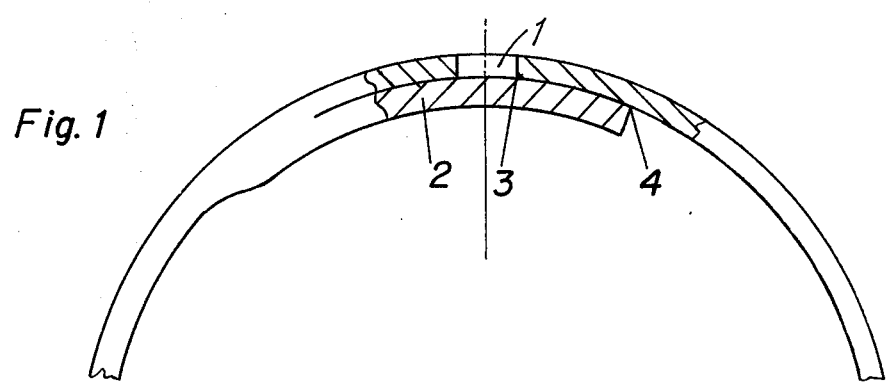
FIG. 1 is a fragmentary part-sectional end view of a first embodiment of irrigation means comprising a tube containing a baffle strip in the form of a flap.

5a to 5c construction in the manner in which the tube is secured in the curled condition;

FIGS. 7a and 7b are views similar to FIGS. 5a and 5b, respectively, of a modification of the FIG. 2 construction;

FIGS. 8a and 8b are views similar to FIGS. 5a and 5b, respectively, of a modification of the FIG. 1 construction; FIG. 9 is an end view of a further modification of the FIG. 1 construction showing the tube in the as-made condition;

FIG. 10 is an end view corresponding to FIG. 9 but showing the tube in a curled condition when ready for use;

FIG. 11 is a fragmentary side elevation of the FIG. 10 construction viewed from inside the tube with the flap omitted; and FIGS. 12 to 14 are views similar to FIGS. 12 to 14, respectively, of a still further modification of the FIG. 1 construction.

DESCRIPTION OF THE PREFERRED EMBODIMENTS

In FIGS. 1 to 4, the tube is extruded as a closed section and subsequently perforated; in the remaining Figures, the tube is made in strip or band form, then perforated, and subsequently curled to tubular form.

Referring to FIG. 1, the illustrated tube is provided with apertures 1 (only one is visible) and each aperture 1 is prevented by a baffle strip in the form of a flap 2 which is provided inside the tube and is made in one piece therewith. The flap 2 is pressed against the inner surface of the tube under the pressure of the liquid supplied to the tube. This liquid pressure is reduced to zero in a throttle gap defined between the confronting faces of the tube and flap between points 4 and 3. The pressure of the liquid in the tube therefore automatically controls the resistance offered by the throttle gap to the outflow of liquid. The outflow quantity is determined by the surface roughness of the contacting faces defining the said gap.

In the embodiment of tube according to FIG. 2, an outlet aperture is indicated at 5. The baffle strip is here in the form of a diaphragm having connected to the tube, and possessing inlet apertures 6 for the liquid to reach the apertures 5. The diaphragm is pressed against the inner surface of the tube by the internal pressure exerted by the liquid. The liquid entering through the aperture 6 flows through the control or throttle gas between the points 8 and 7 and leaves through the apertures 5. Here, too, the outflow quantity is determined by the surface roughness of the faces in contact along the throttle gap.

Figure 3:
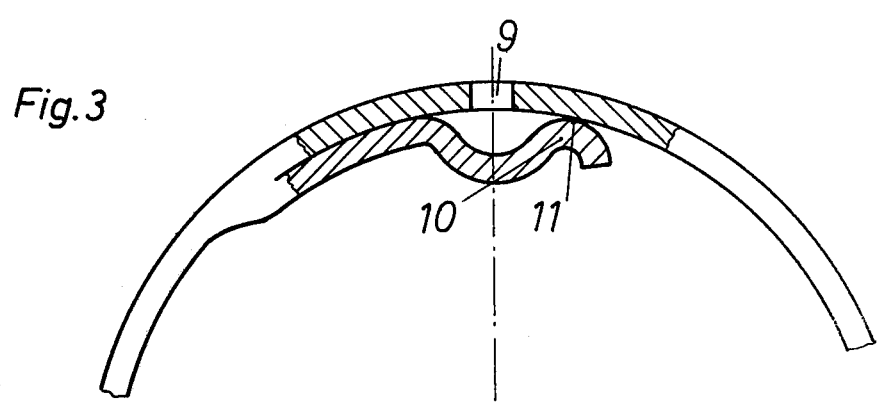
FIG. 3 is a similar view of a modification of the FIG. 1 embodiment, wherein the flap is shaped differently.

The tube according to FIG. 3 possesses a flap 10 connected at only one side as in FIG. 1. The flap 10 is preshaped so that its free longitudinal end portion makes line contact with the inner surface of the tube and forms a throttle gap 11 which is displaceable and the position of which depends on the liquid pressure. Adjacent the outlet apertures 9, the flap bounds a longitudinal channel for the liquid. The liquid passing through the gap 11 reaches the outlet apertures through the said channel. The displaceability of the gap 11 brings about an automatic cleaning effect. Before the liquid attains full pressure, the flap 10 is somewhat spaced from the inner surface of the tube so that any impurities arriving with the first amount of liquid are flushed out.

Figure 4:
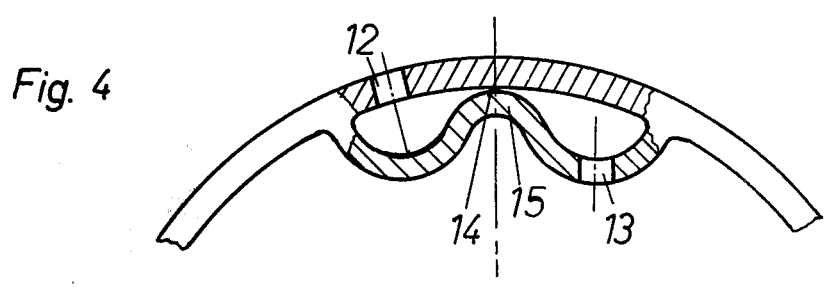
FIG. 4 is a similar view of a modification of the FIG. 2 embodiment, wherein the diaphragm is shaped differently.

The tube according to FIG. 4 possesses a diaphragm 15 which, as in the FIG. 2 embodiment, is connected to the tube at both sides. Accordingly, the diaphragm also possesses inlet apertures 13 for the entry of liquid to a throttle gap 14. The tube itself again possesses outlet apertures 12. By means of the corrugated shape of the diaphragm as evident from the drawing, the liquid entering through the apertures 13 and leaving through the apertures 12 is controlled in the throttle 14. In the unpressurised condition, the central portion of the diaphragm 15 is clear of the tube so that the control or throttle gap 14 is large and impurities are flushed out in the same way as in the FIG. 3 embodiment.

Whereas the constructions of FIGS. 1 to 3 require that either or both of the contacting portions of the tube and flap or diaphragm exhibits a throttle gap by reason of the surface structure, surface roughening could possibly be dispensed with in the FIG. 4 embodiment by reason of the particular shape and attachment of the diaphragm 15.

In a modification (not shown) of the embodiment described with reference to FIGS. 1 to 4, the flaps or diaghragms are attached to the tubes by press studs.

Whereas in the embodiments described with reference to FIGS. 1 to 4 the tubes are made as closed sections and place high requirements on production, manufacture of the irrigation system can be considerably simplified if, in accordance with the modifications to be described hereinafter, the tube is open in the as-made condition. FIGS. 5a, 6a, 7a and 8a show the respective open section as made and FIGS. 5b, 6b, 7b and 8b show the respective subsequently closed section in the condition of installation and use.

The tube of FIGS. 5a, 5b and 5c is extruded in strip or band form from plastics material and is provided at one longitudinal edge with a flange in the form of a pressure or slide fastener section 16. A cooperating flange is provided at 17 intermediate the longitudinal edges. The flap 18 is extruded in one piece with the band. The outlet apertures 19 are stamped out subsequently. When the closed section has been made by interlocking the pressure or slide fastener sections 16, 17, the flap 18 underlies the outlet aperture 19. The pressure or slide fastener sections should be such that the connection 20 (FIG. 5c) is watertight and cannot become automatically undone.

The modification of FIGS. 6a, 6b, differs from that of FIGS. 5a to 5c merely in that the flanges 21, 22 are interconnected by means of welding.

In FIGS. 7a, 7b three flat strips 23, 24 and 25 are provided. The strips 23 and 24 are perforated to form outlet apertures and inlet apertures, respectively. The closed tube is, as clearly evident from FIG. 7b, brought about in that the two apertured strips 23, 24, are together curved in one direction and the unperforated strip 25 is curved in the opposite direction. The interconnection of the three strips is effected at the locations 26 and 27 by welding.

The FIGS. 8a and 8b modification differs from that of FIGS. 7a, 7b in that a single preperforated wide strip 28 is shaped to a tube and the flap for controlling liquid flow to the outlet apertures is formed from a narrower strip 29. As shown in FIG. 8b, the strips are welded to one another at the locations 30 and 31.

The preferred modifications according to FIGS. 9 to 11 and 12 to 14 are made in the manner already described with reference to the embodiment of FIGS. 5a to 5c. Thus, the tube has a flap 34 which, as is evident from FIG. 9, is provided with a pressure or slide fastener section in the form of a flange. At the side of the strip or band forming the inner surface of the closed tube there is formed a ridge or rib 38 which can be made in one piece with the strip by extrusion. This establishes a longitudinal channel 32 between the flap 34 and the confronting inner surface of the tube. The tube is provided with outlet apertures 36 leading from the longitudinal channel 32. The ridge 38 is provided with openings 40 at certain intervals.

The modification shown in FIGS. 10 to 14 differs from that just described merely in that three parallel ridges or ribs 39 having openings 41 are provided so that three parallel longitudinal channels 33 are formed to create a kind of labyrinth through which the liquid must flow.

The control function in the embodiments of FIGS. 9 to 11 and 12 to 14 is also brought about by the rib 38 or parallel ribs or ridges 39, respectively, on the tube defining a throttle gap or gaps with the flaps 34 or 35, respectively. The flap changes the flow resistance as a function of the internal pressure. A high outflow resistance is thereby again automatically offered to the liquid at high liquid pressure. The water or liquid flows to the outlet apertures through the throttle gap or gaps controlled by the internal pressure. By means of a plurality of parallel ridges, a much longer control gap can be formed along shorter lengths.

I claim:

1. Irrigation means for the uniform distribution of a controlled quantity of liquid comprising a tube for receiving the liquid under pressure, said tube having a plurality of outlet apertures spaced lengthwise thereof, a flexible baffle strip arranged within said tube to underlie said apertures, said baffle strip extending lengthwise of said tube and being attached thereto at only one longitudinal side thereby forming an elongate flap, said flap having a first longitudinally extending portion containing said one attached longitudinal side and which extends up to and beneath said apertures and a second longitudinally extending portion containing a free opposite longitudinal side and which projects beyond said outlet apertures, said flap being spaced so as to conform generally to the cross-sectional contour of said tube so that said projecting second flap portion makes contact with said tube to define therewith a throttle gap through which the liquid flows to reach said outlet apertures, said throttle gap producing a flow resistance which is governed by the pressure of the liquid received in said tube.

2. Irrigation means as defined in claim 1, wherein said tube includes a tubular wall and wherein said baffle strip is formed integrally in a one-piece construction with said tubular wall.

3. Irrigation means as defined in claim 2, wherein said baffle strip and said tubular wall are formed from a single strip of flexible material, said strip being provided with a first flange along one longitudinal edge and a second flange intermediate said one longitudinal edge and an opposite longitudinal edge, said strip being curled so that said flanges are in juxtaposition and secured to one another.

4. Irrigation means as defined in claim 3, wherein said flanges are shaped for interlocking engagement.

5. Irrigation means as defined in claim 3, including a rib formed on said strip intermediate said flanges so as to make substantially line contact with said projecting second flap portion.

6. Irrigation means as defined in claim 5, wherein said rib is provided with holes spaced-apart lengthwise thereof.

7. Irrigation means as defined in claim 6, wherein said holes in said rib are offset lengthwise of said flap with respect to said outlet apertures.

8. Irrigation means as defined in claim 3, including a plurality of spaced parallel ribs formed on said strip intermediate said flanges so that each rib makes substantially line contact with said projecting second flap portion.

9. Irrigation means as defined in claim 8, wherein each said rib is provided with holes spaced-apart lengthwise thereof.

10. Irrigation means as defined in claim 1, wherein said projecting second flap portion is shaped so as to make surface contact with said tube.

11. Irrigation means as defined in claim 1, wherein said projecting second flap portion is curved so as to make substantially line contact with said tube.

* * * * *